(12) United States Patent
Brancheriau et al.

(10) Patent No.: US 6,685,261 B2
(45) Date of Patent: Feb. 3, 2004

(54) METHOD FOR PRODUCING TWO FASCIAS USING TWO VENTILATION STRUCTURES

(75) Inventors: Christian Brancheriau, Meru (FR); David Duchez, Meru (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 10/283,341

(22) Filed: Oct. 30, 2002

(65) Prior Publication Data

US 2003/0083006 A1 May 1, 2003

(30) Foreign Application Priority Data

Oct. 31, 2001 (FR) .............................. 01 14128

(51) Int. Cl.[7] ............................. B62D 25/08; B60H 1/26
(52) U.S. Cl. ................................... 296/208; 296/187.09
(58) Field of Search ....................... 296/187.03, 187.09, 296/187.12, 193.12, 193.04, 193.06, 208, 70, FOR 112; 454/152, 155, 143, 69; 180/90

(56) References Cited

U.S. PATENT DOCUMENTS

| 5,354,114 A | * 10/1994 | Kelman et al. ............. 296/192 |
| 5,364,159 A | * 11/1994 | Kelman et al. ............. 296/192 |
| 5,678,877 A | * 10/1997 | Nishijima et al. ............ 296/70 |
| 5,762,395 A | * 6/1998 | Merrifield et al. ..... 296/203.01 |
| 6,273,495 B1 | 8/2001 | Haba et al. |
| 6,305,733 B1 | 10/2001 | Rahmstorf et al. |
| 6,582,005 B2 | * 6/2003 | Takano ........................ 296/70 |

FOREIGN PATENT DOCUMENTS

| DE | 3510336 A1 | 10/1986 |
| DE | 42 32 847 | * 3/1994 |
| FR | 2763287 | 11/1998 |
| FR | 2771054 | 5/1999 |
| FR | 2805777 A1 | 9/2001 |

* cited by examiner

*Primary Examiner*—Harold Joyce
(74) *Attorney, Agent, or Firm*—Rothwell, Figg, Ernst & Manbeck, P.C.

(57) ABSTRACT

A method for producing two fascias using two ventilation structures which are common at least in part, comprising the steps of producing a first and a second ventilation structure, each comprising one or more pliable duct portions identical between one ventilation structure and the other; producing a first cover for a fascia, having one or more first air vents, and a second fascia cover, different from the first, and having one or more second air vents; positioning the pliable duct portions of the first ventilation structure by way of first positioning lug and assembling said pliable duct portions of the first ventilation structure and the first air vents; positioning the pliable duct portions of the second ventilation structure by way of second positioning lug distinct from the first, and assembling said pliable duct portions of the second ventilation structure and the second air vents.

7 Claims, 4 Drawing Sheets

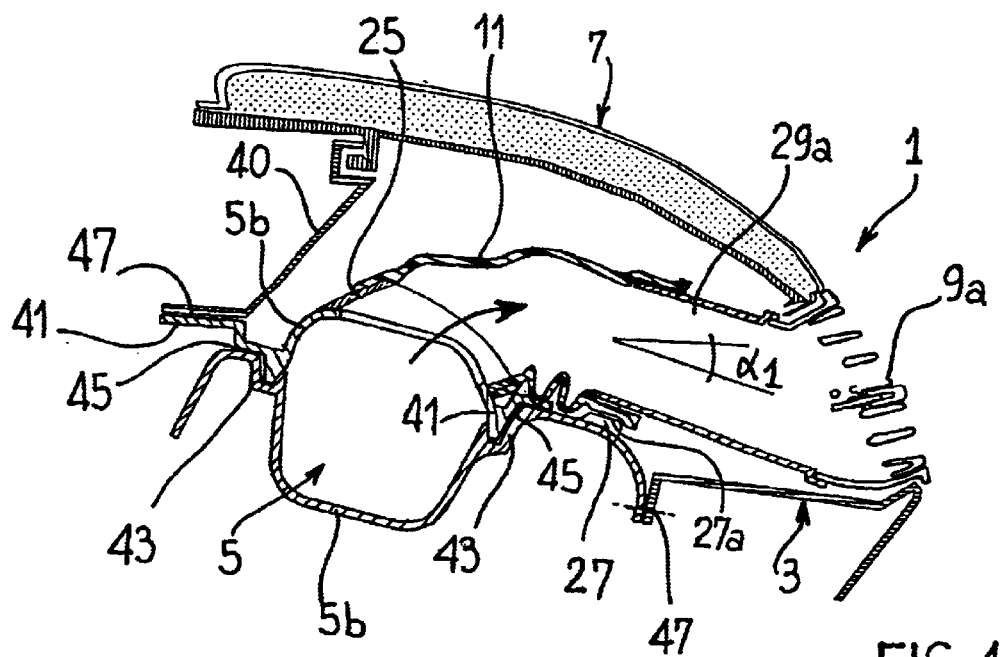
FIG_1
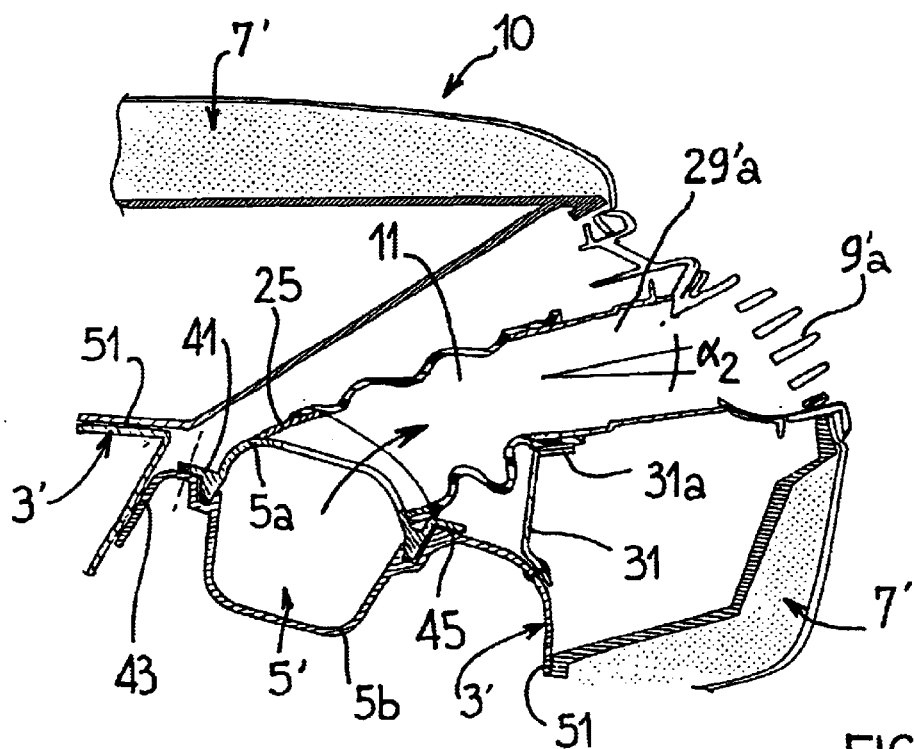
FIG_4

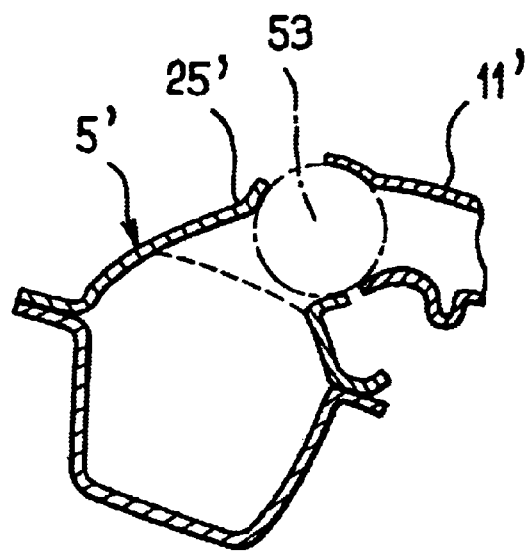
FIG_6
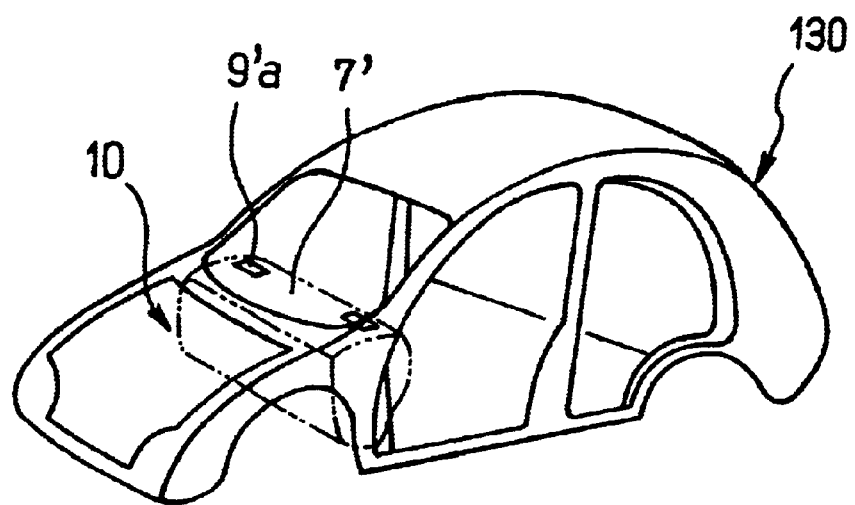
FIG_7

METHOD FOR PRODUCING TWO FASCIAS USING TWO VENTILATION STRUCTURES

TECHNICAL FIELD

The invention relates to the production of fascias (also called dashboards) intended to equip the interior passenger compartment of motor vehicles.

BACKGROUND ART

Fascias are major parts of motor vehicles. They are typically fixed to the structural framework (otherwise termed "body") of the vehicles.

A problem which arises is that of the versatile nature of the fascias, that is to say, the possibility of using all or part of the fascias on different types of vehicles, with, for example, portions common to vehicles of the "saloon" type and vehicles of the "monospace" type.

In this general context, the invention aims in particular to deal with the problem of the connection between the ventilation structures of the fascias (otherwise termed "air ducts") and the air vents located on the facade.

To facilitate the manufacture of such areas of fascias, there has already been proposed in FR-A-2 763 287 a solution improving the positioning of an air duct in order to facilitate its connection to an air vent.

Using ducts which are at least locally pliable (that is to say, flexible, deformable) has moreover been proposed. Thus, in FR-A-2 771 054, different means are proposed for holding a pliable duct for the purpose of its assembly.

A problem which nevertheless remains is that of a greater versatility between the members of fascias making it possible to limit the number of parts to be designed, manufactured and assembled, while facilitating the operations of assembly between the air ducts (ventilation structures) and the air vents, for different types of vehicles.

DISCLOSURE OF THE INVENTION

A solution provided by the invention consists of a method for producing two fascias using two (at least in part) common ventilation structures, comprising the following steps:

a) producing a first and a second ventilation structure, each comprising one or more pliable duct portions identical between the ventilation structures, b) producing a first fascia cover having one or more first air vents, and a second fascia cover, different from the first and having one or more second air vents (optionally only some air vents could be different from one cover to the other, in terms of position and/or shape and/or dimensions, etc., the covers being otherwise identical in this hypothesis), c) establishing in an assembly position the pliable duct portion(s) of the first ventilation structure by way of (a possibly first lug provided with) first positioning means and assembling said pliable duct portion(s) of the first ventilation structure and the first air vent(s), d) establishing in an assembly position the pliable duct portion(s) of the second ventilation structure by way of (a possibly second lug provided with) second positioning means distinct from the first, and assembling said pliable duct portion(s) of the second ventilation structure and the second air vent(s).

With this solution, the assembly operations are facilitated and the costs are reduced.

Still with the same objective of versatility, if the aforesaid first and second lugs are used, they may each be provided with the first and second positioning means. In particular, the first and second lugs may be identical.

In order to facilitate still further the incorporation of the parts in a common structure, another feature of the invention recommends that during step a) a first and a second identical ventilation structures are produced and, preferably, the pliable duct portion(s) is/are connected to the first and/or the second ventilation structure(s) by way of a rigid connection, subsequent to a step of over-moulding or of co-moulding in the same mould, of the ventilation structures with the pliable duct portions.

Thus it will be possible to reduce the assembly times by avoiding the operators having sometimes to intervene in places which are difficult to access.

As an alternative or in addition to the preceding feature, other aspects of the invention propose:

mounting the pliable duct portion(s) on a ball-and-socket joint with respect to the area of connection to the first and/or the second ventilation structure, during step a), using pliable duct portions having an area deformable both in elongation and in angular orientation, and/or moulding in one piece at least one of the first and second lugs with the first and/or the second ventilation structure(s).

In that case again, the times and possible difficulties of assembly can be limited.

Once again, in order to propose a solution increasing the versatility, or multi-applications to different types of vehicles, of a significant portion of fascia, another feature of the invention proposes, for two different vehicles:

producing a first and a second fascia body different from each other and adapted to receive, fixed over them, respectively the first and second covers, which are intended to be disposed on the facade (also called front surface) of the passenger compartment, during the aforesaid step a), producing the first and second ventilation structures so that they each have identical fixing areas allowing them to be fixed irrespectively to said first and second fascia bodies, fixing the first and second ventilation structures respectively to the first and second fascia bodies, at the location of at least some of said fixing areas, then fixing each assembly of the first and second fascia bodies and ventilation structures, respectively to the first and second covers, and also to the body of each vehicle.

BRIEF DESCRIPTION OF THE DRAWINGS

FIGS. 1 and 4 each correspond to a cross-section of a fascia, at the location of an air vent, for vehicles respectively of the saloon and the monospace type, FIG. 6 shows a ball-and-socket joint on the pliable duct, and FIG. 7 shows diagrammatically a monospace type vehicle body.

DETAILED DESCRIPTION OF THE INVENTION

Figure 2:
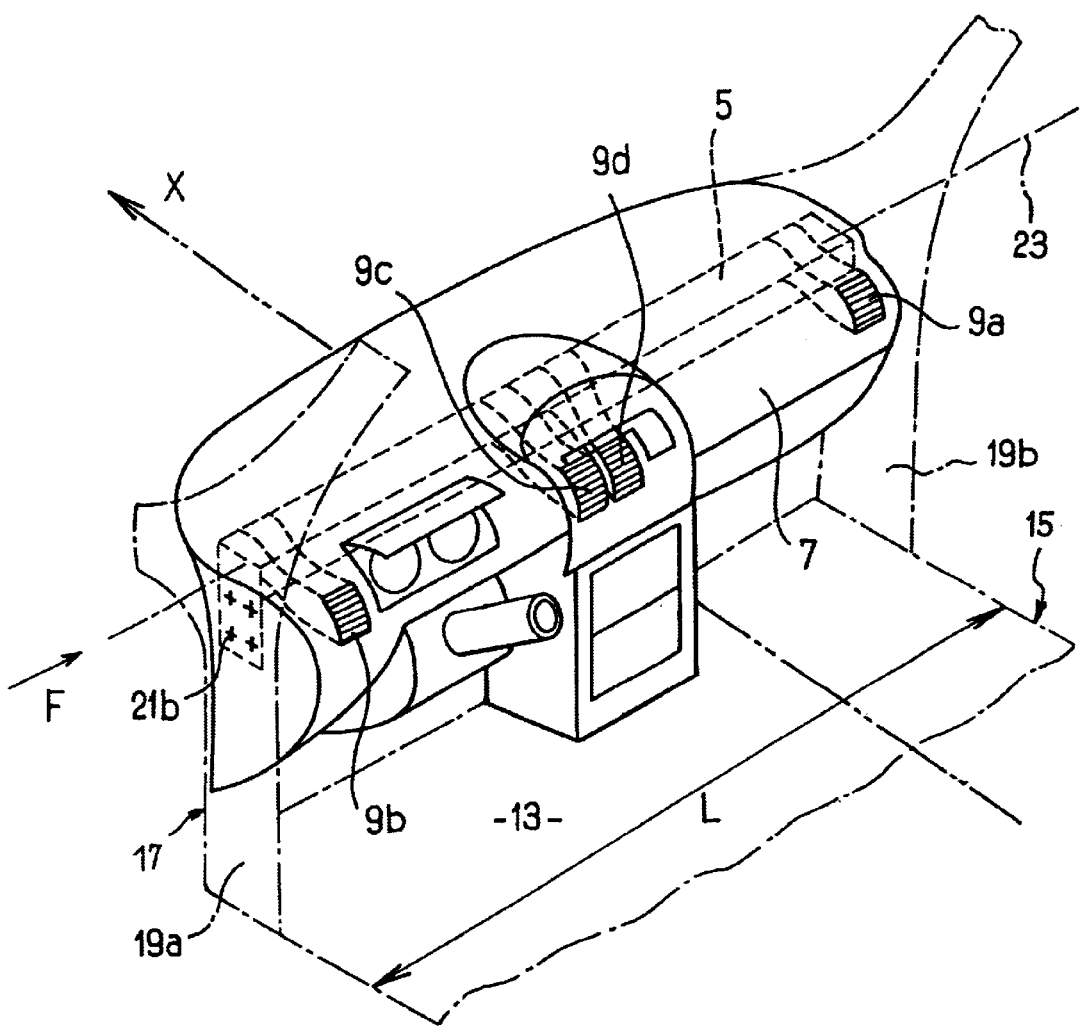
FIG. 2 is a partial diagrammatic view in perspective of the fascia of FIG. 1 installed in the passenger compartment of a saloon type vehicle.

In FIG. 1 can be seen a fascia section identified as a whole by 1.

The illustrated portion of this fascia shows that the latter comprises a fascia (or dashboard) structural body 3, a ventilation structure 5, and a cover 7 equipped with an air vent 9a. A pliable duct portion 11 connects the air vent 9a to a ventilation structure (here similar to the main air diffusion duct 5).

As FIG. 2 shows, the fascia 1 is intended to equip the interior passenger compartment 13 of a motor vehicle 15.

Figure 3:
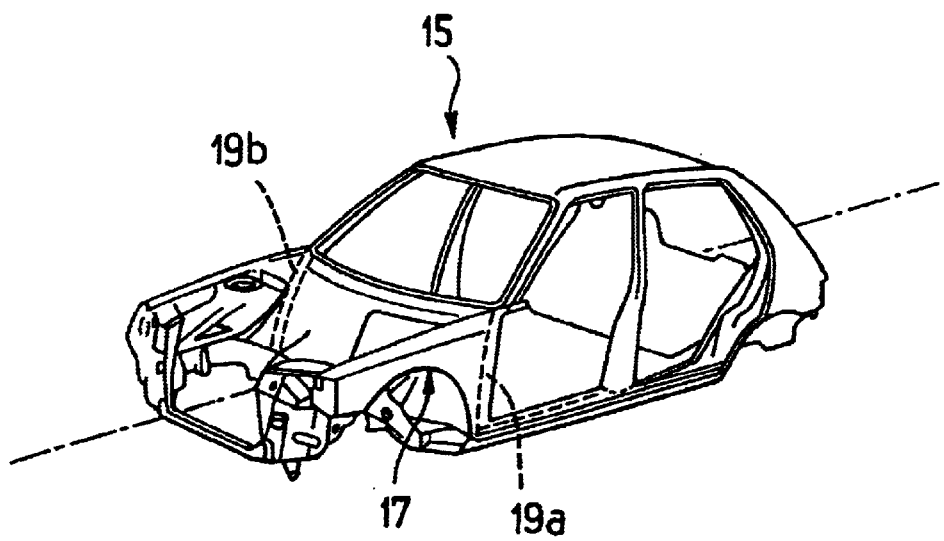
FIG. 3 shows a saloon type vehicle body.

FIG. 3 shows that the vehicle 15 comprises a structural body 17 comprising in particular two A pillars, 19a, 19b (see also FIG. 2) to which the fascia 1 is fixed laterally (at its longitudinal ends) by the fixing means such as those identified by 21b in FIG. 2 (welding, screwing, etc.).

In the solution illustrated in FIG. 2, the main air duct 5 constitutes a structural part for the vehicle, typically referred to as "cross beam", this box-type part 5 participating in the mechanical structuring of the vehicle by concentrating on it, and by absorbing by controlled deformation, part of the stresses resulting from a frontal impact or from a side impact corresponding for example to a stress F in the direction of the longitudinal axis 23, as in FIG. 2 (which axis is perpendicular to the direction of advance X of the vehicle, when the fascia is mounted on the vehicle).

It should be noted that the fixings (such as 21b) between the fascia 1 and the body of the vehicle concerned (in this instance, A pillars, 19a, 19b) may be effected by means of fixing lugs (also called tongues) connected to the fascia body 3 and/or to the air duct 5 (in this respect, the use of connecting lugs such as those indicated by 5, 63a, 63b, 140, 142 or 156 in EP-A-1 063 151 may be provided). The closed ends of a mechanically structural air duct, such as the air duct 5, may also be provided with (or connected to) fixing lugs between the assembly 3, 5 and the body of the vehicle. In the solution in FIG. 2, the fixing means 21b connect the body 17 to the fascia body 3.

Over and above these questions of assembly, FIGS. 1 and 4 together illustrate an important feature of the invention which makes it possible to produce two fascias 1, 10, using two fascia bodies (3, 3') which are different here, two ventilation structures which may be identical, connected to air vents 9a, 9'a which are different (in their shapes, locations, inclinations ... or others), by way of two identical pliable duct portions 11 connected to the air duct concerned 5 (or 5').

FIG. 1 shows diagrammatically a portion of fascia 1 for a saloon type vehicle.

FIG. 4 shows a fascia 10 for a monospace.

The covers 7 and 7' for these two types of fascia are different in the example, at least with regard to their shape in proximity to the air vents illustrated, 9a, 9'a.

The air vent 9a is located lower on the cover 7 than is the air vent 9'a on the cover 7'.

The angular position of the connecting channel, respectively 29a and 29'a, of the air vents 9a and 9'a, is also different in the two cases (angle $\alpha_1$ in FIG. 1 and $\alpha_2$ in FIG. 4), as well as the distance between the free connecting end of each of the channels 29a, 29'a and the air duct.

It is moreover why the pliable duct portions 11 are advantageously produced in a flexible material, deformable preferably both in elongation and in angular orientation.

The use of pleated duct sections 11, with accordion pleats for example, and made of polypropylene may prove favourable.

On the air duct 5 (or 5') side, the connection between the pliable portion 11 and the duct is effected by means of a rigid plastic end-piece 25 which projects locally from the duct and to which one end of the portion 11 is connected.

In practice, a shrunk-on ring or any fixing means may hold the areas 11 and 25 connected together.

An interesting alternative, which may produce savings at least in terms of assembly, may be found in the use of a technique of over-moulding, or of injection of two materials co-moulded in the same mould, of the two parts 5 (or 5') and 11.

In the case of over-moulding, once the ventilation structure is moulded, there is added (typically injected) in another cavity of the same mould, or in another mould, a suitable quantity of material round the formed rigid end-piece 25, so that the plastics material of the part 11 and that of the section 25 weld to each other, thus making it possible to obtain an assembly comprising one or more sections of pliable duct 11 incorporated integrally with a ventilation structure 5.

In the case of co-moulding, the two flows of materials that are to constitute the parts 5 (or 5') and 11 are injected into the same mould, each typically while the other material is not yet cooled, so that the materials cool together.

In order to place the connecting end of each pliable duct portion 11 in a suitable mounting position opposite the end of the connecting channel 29a, 29'a concerned of the air vent, it can be seen in FIGS. 1 and 4 that a lug (or tongue), respectively 27, 31 is used, provided in each case with at least one positioning means, respectively 27a, 31a, making it possible to establish the pliable duct portion in its appropriate position.

In FIGS. 1 and 4, the lugs 27, 31 are fixed to the fascia bodies 3, 3' (by screwing, welding, rivetting, etc.). The lug 27 has a much more flattened shape than the lug 31, which stands up clearly above the fascia body and the air duct.

The lugs could also have been manufactured at the same time as the air ducts and therefore formed with them, in one piece, by moulding.

An advantage then consists in omitting one assembly step and in possible pre-positioning in the mould of the corresponding pliable duct portion which could be placed directly in an operational position.

The positioning means 27a, 31a of the lugs may in particular consist of support plates or cradles, or even of rings or portions of rings. Complementary clamping or fixing means may be added (not shown).

Figure 5:
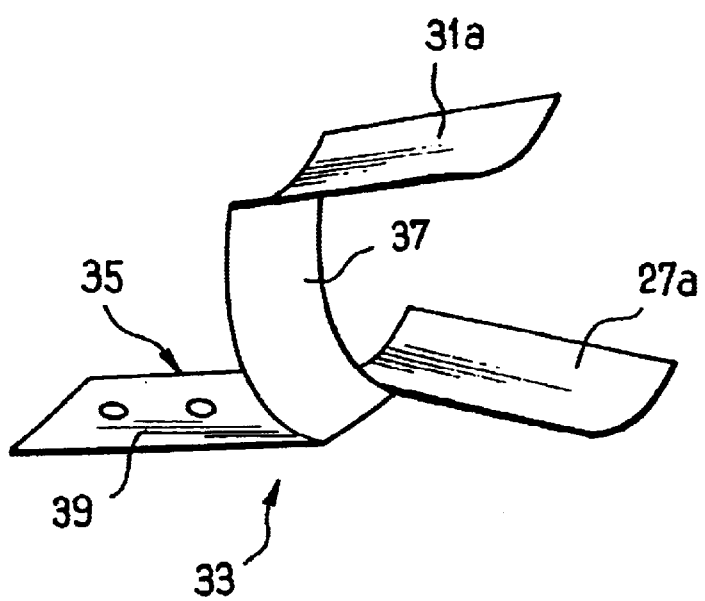
FIG. 5 shows a lug provided both with first and second means for positioning pliable duct portions.

In FIG. 5 can be seen an alternative embodiment of an assembly lug identified by 33 which could be substituted for the preceding lugs, both 27 and 31. There would thus be, for the two different types of fascia, such as 1 and 10, two separate but identical lugs 33.

The lug 33 comprises a plurality of (in this instance two) support cradles which may be strictly identical to the trays 27a, 31a, in shape, dimensions, position and orientation (the same reference numbers have moreover been attributed thereto), with the particular feature that these two positioning surfaces are linked to a common body 35 comprising an upright portion 37 and a fixing surface 39 intended for the connection of the lug 33 to the fascia body and/or the ventilation structure concerned (3, 3' or 5, 5').

The part 33 may be a metallic part or a part made of rigid plastics material.

Depending on the case, once the part 33 is installed, a pliable duct portion 11 will rest either on the tray 31a, in a high position (like the solution envisaged in FIG. 4), or on the lower tray 27a, in a low position (like that illustrated in FIG. 1).

Concerning the ventilation structure 5 (or 5') and the fascia body 3, it will further be noted as follows:

Each ventilation structure may be constituted in two portions, each in the shape of a half shell, 5a, 5b, which are connected together laterally at the location of longitudinal external flanges 41, 43, where the two half shells may be, for example, welded together by vibration. In a plurality of locations distributed axially along the duct 5 (or 5'), the latter will additionally have, externally, fixing areas, such as 45 in FIGS. 1 and 4, which will therefore advantageously be identical for all the ventilation structures, so as to allow them to be fixed irrespectively to the different fascia bodies, such as 3 and 3'.

The ventilation structure will then be common as a whole (main duct 5 plus pliable portion(s) 11 at least) to a plurality of types of fascia bodies, as to a plurality of types of covers 7, 7'.

For the remainder, the main ducts 5, 5' could have been strictly identical (which they will certainly be in practice), the differences between them in FIGS. 1 and 4 having the aim of showing that such a main duct may be fixed irrespectively to the cover (FIG. 1, via the rigid lug 40) or to the fascia body (3', fixing by the limb 43 in FIG. 4).

Moreover, it may be the ventilation structure or the fascia body which will carry fixing means for a connection between the pre-assembled fascia body/ventilation structure assembly and the cover concerned.

In FIG. 1, it is the external flange 41 of the ventilation structure which carries fixing means for fixing to the cover 7 (at 47), while in FIG. 4 it is the fascia body 3' which carries the fixing means 51 for fixing to the cover 7'.

Fixing areas other than 47 and 51 between the cover and the ventilation structure/fascia body assembly will of course have been provided.

In terms of principal steps of assembly, the following may be noted:

The fascia bodies and the air ducts are preferably manufactured independently of one another. The covers are in any case manufactured separately.

The pliable duct portions 11 common to the different ventilation structures may be manufactured at the same time as the latter, being moulded with them. Not only can such structures be manufactured with one or more pliable duct(s) 11 identical between one ventilation structure and the other, but it is recommended to manufacture ventilation structures which are themselves generally identical (at least as regards the main duct such as 5 and the pliable portions 11) for at least two different types of fascia.

The positioning lugs 27, 31 (or the single common lug 33) are preferably added on and fixed in proximity to the ventilation structure concerned, either to the latter, or to an adjacent area of the fascia body, preferably after fixing (if necessary) of the parts 3 and 5 or 3' and 5 to each other with then, advantageously, provision of identical fixing areas having actually made it possible to use only a single ventilation structure 5 for different types of fascia bodies such as 3 and 3'.

After that, while each pliable duct 11 is in its operational position, supported by the suitable positioning means of the lug, there will then be placed over this assembly the appropriate cover, such as 7 or 7', by fitting the free end of the connecting channel (such as 29a or 29'a) of each air vent into the free open end of the corresponding duct 11, after which the fascia body/ventilation structure assembly is fixed, at different places, to the cover and then to the body 17 of the vehicle concerned.

In this regard, the fascia 10 of FIG. 4 will preferably be assembled in a "monospace" type vehicle of FIG. 7, while the fascia 1 of FIG. 1 will preferably be assembled to a vehicle body of the "saloon" type as in FIG. 3.

It only remains that other categories of vehicles may be concerned.

In order to avoid any ambiguity, it is indicated that the name "cover" has been used herein for any portion of fascia which constitutes the outer facade (or surface) of the fascia, in particular in the upper portion thereof, any cover having a decorative outer covering (leather, fabric, plastic, etc.) facing the passenger compartment, the "fascia body" being a structural part, or an assembly of parts, comprising rigid plastic parts having a function of supporting the fascia and to which there is typically fixed the ventilation or air-conditioning block and/or the instrument panel unit located facing the driver, behind the steering wheel.

With regard to the aforesaid "ventilation structures", these comprise in particular a main air diffusion duct extending generally over at least the essential part of the width L of the passenger compartment (FIG. 2) generally in the direction of the transverse axis 23, to provide the circulation and a priori the distribution of the air coming from the ventilation/air-conditioning block towards the air vents, in this instance left-hand and right-hand side air vents 9a, 9b and central air vents 9c, 9d, the main air diffusion duct also being able (as indicated previously herein) to have a function of cross-beam, similar to that explained in EP-A-1 063 151 (concerning the beam 124; see in particular column 11, line 33 to column 12, line 57).

When speaking of common "ventilation structures", one therefore speaks at least of "main air diffusion duct" such as 5, and of "section(s) of pliable duct 11 common (identical) to several (different) types of fascia.

In FIG. 6, the connection between the pliable duct section 11' illustrated and the duct 5' is provided with a ball-and-socket joint shown diagrammatically at 53, facilitating the articulation and therefore the angular position of the section 11. The ball-and-socket joint 53 may be provided on the rigid connection 25' or on the pliable section 11'.

In FIG. 7, a monospace body (chassis) 130 is provided with the fascia 10 of FIG. 4, with the trim cover 7' and an air vent identified by 9'a.

What is claimed is:

1. A method for producing two fascias using two ventilation structures which are common at least in part, comprising the following steps:
    a) producing a first and a second ventilation structures, each comprising at least one pliable duct portion identical between one ventilation structure and the other,
    b) producing a first fascia cover having at least one first air vent and a second fascia cover, different from the first, and having at least one second air vent,
    c) positioning in an assembly position said at least one pliable duct portion of the first ventilation structure by way of first positioning means and assembling said at least one pliable duct portion of the first ventilation structure and said at least one first air vent,
    d) positioning in an assembly position said at least one pliable duct portion of the second ventilation structure by way of second positioning means distinct from the first and assembling said at least one pliable duct portion of the second ventilation structure and said at least one second air vent.

2. The method according to claim 1, wherein in order to position said at least one pliable duct portion during steps c) and d), first and second identical lugs are used, each provided with said first and second positioning means.

3. The method according to claim 1, wherein during step a), a first and a second identical ventilation structures are produced and said at least one pliable duct portion is connected to at least one of the first and the second ventilation structures by way of a rigid connection, subsequent to a step comprising one of an over-moulding step and a co-moulding step in a same mould, of the first and the second ventilation structures with said at least one pliable duct portion.

4. The method according to claim 1, wherein said at least one pliable duct portion is connected to at least one of the first and the second ventilation structures by way of a ball-and-socket joint.

5. The method according to claim 1, wherein during step a), said at least one pliable duct portion is used which has an area deformable both in elongation and in angular orientation.

6. The method according to claim 1, wherein:
it further comprises the step of providing the first and second ventilation structures with a first lug and a second lug, respectively, said first and second lugs comprising the first positioning means and the second positioning means, respectively, and, at least one of the first and second lugs is produced by moulding, in one piece, with at least one of the first and the second ventilation structures.

7. The method according to claim 1, wherein:

said fascias are intended to equip the interior passenger compartment of two different motor vehicles, each comprising a body, a first and a second fascia body are produced which are different from each other and adapted to receive, fixed over them, respectively the first and second covers, which are intended to be disposed on the facade of the passenger compartment, during step a), the first and second ventilation structures are produced so that they each have identical fixing areas allowing them to be fixed irrespectively to said first and second fascia bodies, the first and second ventilation structures are fixed respectively to the first and second fascia bodies, at the location of at least some of said fixing areas, then each assembly of the first and second fascia bodies and ventilation structures are fixed respectively to the first and second covers, and also to the body of each vehicle.

\* \* \* \* \*